(12) United States Patent
Huitema et al.

(10) Patent No.: US 7,391,725 B2
(45) Date of Patent: Jun. 24, 2008

(54) SYSTEM AND METHOD FOR DEFEATING SYN ATTACKS

(76) Inventors: Christian Huitema, 9645 NE. 32nd St., Clyde Hill, WA (US) 98004; Henry L. Sanders, 319 8th Ave. West, Kirkland, WA (US) 98033; Sanjay N. Kaniyar, 8500 NE. 148th Ave., Redmond, WA (US) 98007

( * ) Notice: Subject to any disclaimer, the term of this patent is extended or adjusted under 35 U.S.C. 154(b) by 807 days.

(21) Appl. No.: 10/847,341

(22) Filed: May 18, 2004

(65) Prior Publication Data
US 2005/0259644 A1 Nov. 24, 2005

(51) Int. Cl.
H04L 12/26 (2006.01)
G06F 15/16 (2006.01)
G06F 21/00 (2006.01)

(52) U.S. Cl. ............... 370/230.1; 370/242; 370/395.52; 709/203; 709/228; 726/22

(58) Field of Classification Search ............. 370/230.1, 370/242, 395.52; 709/203, 228; 726/22
See application file for complete search history.

(56) References Cited

U.S. PATENT DOCUMENTS

| 6,298,445 | B1 * | 10/2001 | Shostack et al. ............... 726/25 |
| 6,564,267 | B1 * | 5/2003 | Lindsay ...................... 709/250 |
| 6,725,378 | B1 | 4/2004 | Schuba et al. |
| 6,735,702 | B1 * | 5/2004 | Yavatkar et al. ............... 726/13 |
| 6,816,910 | B1 * | 11/2004 | Ricciulli ..................... 709/237 |
| 6,904,519 | B2 * | 6/2005 | Anand et al. ................. 713/100 |
| 6,973,040 | B1 * | 12/2005 | Ricciulli ..................... 370/241 |
| 6,983,325 | B1 * | 1/2006 | Watson et al. ............... 709/228 |
| 7,051,369 | B1 * | 5/2006 | Baba .......................... 726/23 |
| 7,058,718 | B2 * | 6/2006 | Fontes et al. ................ 709/228 |
| 7,114,182 | B2 * | 9/2006 | Robert et al. ................. 726/23 |
| 7,190,671 | B2 * | 3/2007 | D'Souza et al. ............. 370/232 |
| 7,219,228 | B2 * | 5/2007 | Lin ........................... 713/160 |
| 7,269,850 | B2 * | 9/2007 | Govindarajan et al. ........ 726/22 |
| 7,302,705 | B1 * | 11/2007 | Boivie ........................ 726/22 |
| 2001/0042200 | A1 | 11/2001 | Lamberton et al. |
| 2002/0101819 | A1 | 8/2002 | Goldstone |
| 2002/0103916 | A1 | 8/2002 | Chen et al. |
| 2002/0138643 | A1 * | 9/2002 | Shin et al. ................... 709/232 |
| 2003/0061306 | A1 * | 3/2003 | Kanno et al. ................. 709/217 |
| 2003/0108044 | A1 | 6/2003 | Hendel |

(Continued)

OTHER PUBLICATIONS

Russell, Paul. "Keeping the TCP/IP Stream Flowing." *Linux Magazine*, http://www.linux-mag.com/cgi-bin/printer.pl?issue=1999-08&article=bestdefense, Aug. 1999.

(Continued)

*Primary Examiner*—Alpus H Hsu
(74) *Attorney, Agent, or Firm*—Wolf Greenfield & Sacks, P.C.

(57) ABSTRACT

A system and method for defeating SYN attacks are provided. When the number of packets received by a server is above the capacity of the server, the server assumes that a SYN attack is in progress. The server randomly drops SYN packets without processing them. The percentage of SYN packets dropped is increased while the load on the server exceeds capacity, and decreased while the load on the server does not exceed capacity. Under attack conditions, a percentage of TCP connections are still maintained.

30 Claims, 8 Drawing Sheets

U.S. PATENT DOCUMENTS

| | | | |
|---|---|---|---|
| 2003/0200441 A1* | 10/2003 | Jeffries et al. | 713/181 |
| 2004/0008681 A1 | 1/2004 | Govindarajan et al. | |
| 2004/0015721 A1 | 1/2004 | Eastlake, III | |
| 2004/0059944 A1* | 3/2004 | Stademann | 713/201 |
| 2004/0111635 A1* | 6/2004 | Boivie et al. | 713/201 |
| 2004/0123142 A1* | 6/2004 | Dubal et al. | 713/201 |
| 2004/0153669 A1* | 8/2004 | Yang et al. | 713/201 |
| 2004/0187032 A1* | 9/2004 | Gels et al. | 713/201 |
| 2004/0196843 A1* | 10/2004 | Zinin | 370/389 |

OTHER PUBLICATIONS

Wojcik, Michael. "Re: Simple DOS attack on FW-1." http://www.cotse.com/mailing-lists/bugtraq/1999/0869.html, Aug. 5, 1999.

* cited by examiner

SYSTEM AND METHOD FOR DEFEATING SYN ATTACKS

FIELD OF THE INVENTION

The present invention relates generally to computer networking, and relates more particularly to defeating distributed denial of service attacks.

BACKGROUND OF THE INVENTION

When a system (called the client) attempts to establish a TCP connection to a system providing a service (the server), the client and server exchange a set sequence of messages. This connection technique applies to all TCP connections: telnet, Web, email, etc. The client system begins by sending a SYN message to the server. The server then acknowledges the SYN message by sending SYN-ACK message to the client. The client then finishes establishing the connection by responding with an ACK message. The connection between the client and the server is then open, and the service-specific data can be exchanged between the client and the server.

The potential for abuse arises at the point where the server system has sent an acknowledgment (SYN-ACK) back to client but has not yet received the ACK message. This is referred to as a half-open connection. The server has built in its system memory a data structure describing all pending connections. This data structure is of finite size, and it can be made to overflow by intentionally creating too many partially-open connections. Creating half-open connections is easily accomplished with IP spoofing. The attacking system sends SYN messages to the victim server system; these appear to be legitimate but in fact reference a client system that is unable to respond to the SYN-ACK messages. This means that the final ACK message will never be sent to the victim server system.

The half-open connections data structure on the victim server system will eventually fill; then the system will be unable to accept any new incoming connections until the table is emptied out. Normally there is a timeout associated with a pending connection, so the half-open connections will eventually expire and the victim server system will recover. However, the attacking system can simply continue sending IP-spoofed packets requesting new connections faster than the victim system can expire the pending connections.

In most cases, the victim of such an attack will have difficulty in accepting any new incoming network connection. In these cases, the attack does not affect existing incoming connections nor the ability to originate outgoing network connections. However, in some cases, the system may exhaust memory, crash, or be rendered otherwise inoperative. The location of the attacking system is obscured because the source addresses in the SYN packets are often indeterminable. When the packet arrives at the victim server system, there is no way to determine its true source. Since the network forwards packets based on destination address, the only way to validate the source of a packet is to use input source filtering.

Systems providing TCP-based services to the Internet community may be unable to provide those services while under attack and for some time after the attack ceases. Accordingly, several methods have been described to defeat these SYN attacks. One conventional method for defeating SYN attacks is to randomly drop uncompleted connections as the number of SYN packets received increases. In this manner, all SYN packets are assumed to be malicious, and incomplete open connections are randomly deleted from the open connections data structure without prejudice. However, this results in a very low connection establishment rate for non-malicious TCP requests. Moreover, system resources are wasted due to the costs of processing the SYN packet and allocating space in the data structure.

Yet another method for defeating SYN attacks is referred to as SYN cookies. In this method, the TCP stack does not maintain a data structure for uncompleted connections. Instead, all of the information needed to remember the connection is encoded into a sequence number in the reply to the initial SYN packet. If this is a genuine connection, a reply to that packet (completing the three-way handshake) is received, and its acknowledgement number will be one more than the sequence number sent. This number is decoded to give the information needed to identify the connection. This means that the server does not need to remember anything at all, so no memory is used until the handshake is completed. While this method may prove effective, the increased CPU usage is not worth the marginal increase in packet processing power. Furthermore, because the initial sequence number is a deterministic function of the addresses and port numbers, this method is exposed to various kinds of failures and replay attacks.

In still another method for defeating SYN attacks, the amount of memory allocated for each uncompleted connection in the data structure is reduced. Thus, the server is able to maintain more uncompleted connections during an attack. However, this only delays this inevitable, since as the arrival rate of SYN packets increases, the data structure will eventually overflow.

Accordingly, there is needed in the art of TCP request processing a TCP stack capable of defeating SYN attacks by maintaining an acceptable rate of newly established connections during a SYN flood.

BRIEF SUMMARY OF THE INVENTION

In view of the foregoing, one embodiment of the present invention provides a server operating on an Internet Protocol (IP) network and running Transport Control Protocol to allow the establishment of one or more TCP connections with one or more clients, the server being configured to defeat a SYN flood attack, comprising a network interface card (NIC) receiving packets over the network and inserting the packets into at least one queue; and a TCP/IP stack processing packets from the at least one queue, wherein the TCP/IP stack intentionally drops SYN packets at a SYN packet drop rate that is dependent upon the load on the server. In keeping with the features of the invention, the SYN drop rate is increased when the load on the server is above a threshold, and decreased otherwise.

In another embodiment of the invention, the NIC drops packets at a MC drop rate as a result of all available queues being full. The load on the server is determined at least partly by the NIC drop rate. The SYN packet drop rate is increased when the NIC drop rate is greater than zero. In one embodiment of the invention, the SYN packet drop rate is increased by the minimum of a first coefficient and a second coefficient multiplied by the NIC drop rate. In this embodiment, the first coefficient is 0.01 and the second coefficient is 0.20. In keeping with further features of the invention, the SYN packet drop rate is decreased when the NIC drop rate is not greater than zero. In one embodiment of the invention, the SYN packet drop rate is decreased by a coefficient, wherein the coefficient is 0.01. In another embodiment of the invention, the load on the server is determined by the length of the queue.

Another embodiment of the invention provides a method for defeating a SYN flood attack on a server, operating on an Internet Protocol (IP) network and running Transport Control Protocol to allow the establishment of one or more TCP connections with one or more clients, comprising receiving a plurality of packets, the packets including SYN packets and non-SYN packets; determining a load on the server; and adjusting a SYN packet drop rate according to the load on the server, wherein the SYN packet drop rate determines how many SYN packets are dropped. In one embodiment of the invention, the SYN packet drop rate is increased when the load on the server is determined to be above a threshold, and decreased otherwise.

In another embodiment of the invention, a NIC drop rate signifies how many packets are being dropped by a NIC card due to the load on the server. The SYN packet drop rate is increased when the NIC drop rate is greater than zero. In one embodiment of the invention, the SYN packet drop rate is increased by the minimum of a first coefficient and a second coefficient multiplied by the NIC drop rate. In this embodiment, the first coefficient is 0.01 and the second coefficient is 0.20. In keeping with further features of the invention, the SYN packet drop rate is decreased when the NIC drop rate is not greater than zero. In one embodiment of the invention, the SYN packet drop rate is decreased by a coefficient, wherein the coefficient is 0.01. In another embodiment of the invention, the load on the server is determined by the length of the queue.

Yet another embodiment of the invention provides a computer-readable medium having computer-executable instructions for performing the method previously described.

Additional features and advantages of the invention are made apparent from the following detailed description of illustrative embodiments that proceeds with reference to the accompanying figures.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1A:
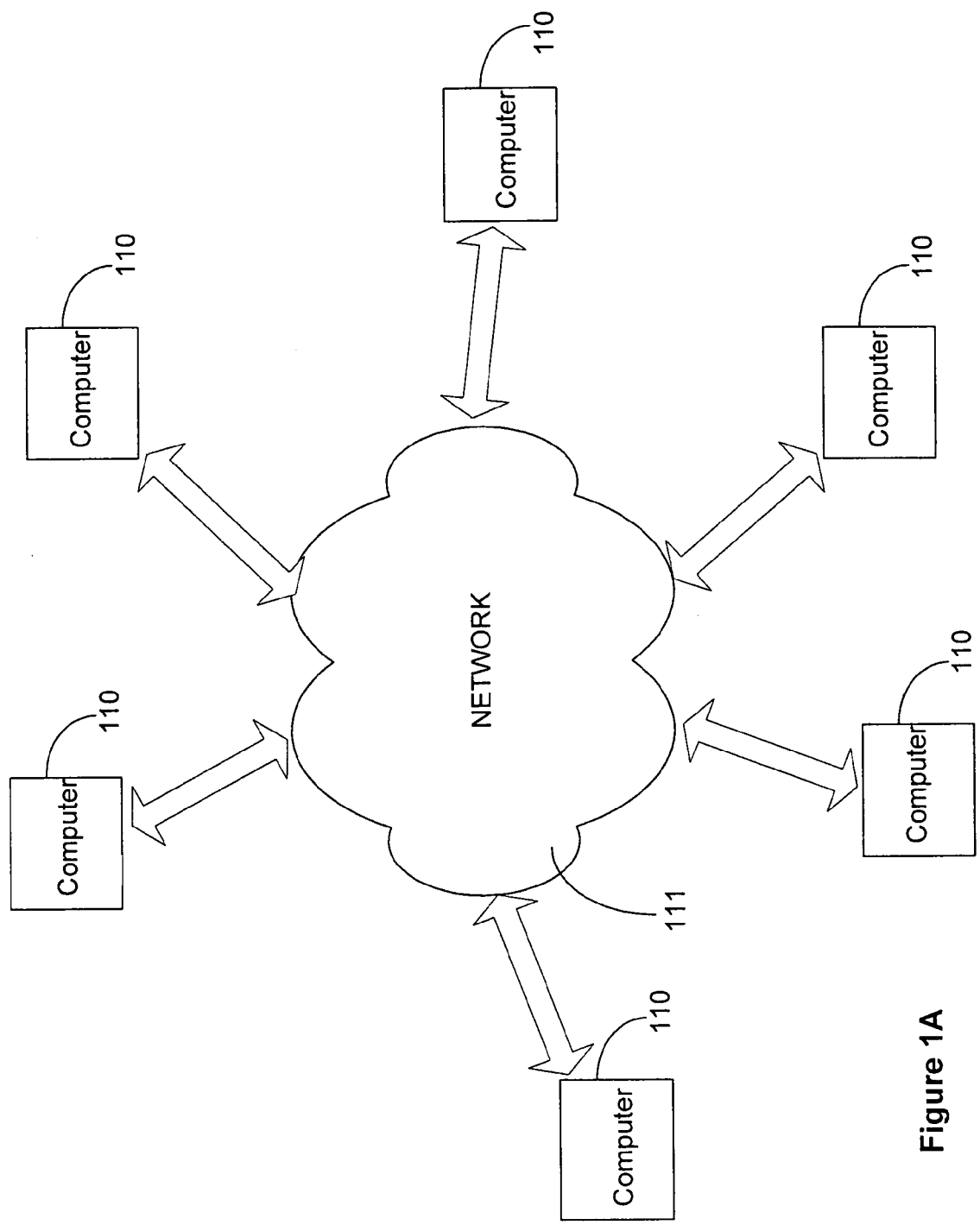
FIG. 1A is a schematic generally illustrating an exemplary network environment across which the present invention operates.

While the invention will be described in connection with certain preferred embodiments, there is no intent to limit it to those embodiments. On the contrary, the intent is to cover all alternatives, modifications, and equivalents as included within the spirit and scope of the invention as defined by the appended claims.

DETAILED DESCRIPTION OF THE INVENTION

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

An example of a networked environment in which the invention may be used will now be described with reference to FIG. 1A. The example network includes several computers 110 communicating with one another over a network 111, represented by a cloud. Network 111 may include many well-known components, such as routers, gateways, hubs, etc. and allows the computers 110 to communicate via wired and/or wireless media. When interacting with one another over the network 111, one or more of the computers may act as clients, network servers, quarantine servers, or peers with respect to other computers. Accordingly, the various embodiments of the invention may be practiced on clients, network servers, quarantine servers, peers, or combinations thereof, even though specific examples contained herein do not refer to all of these types of computers.

Figure 1B:
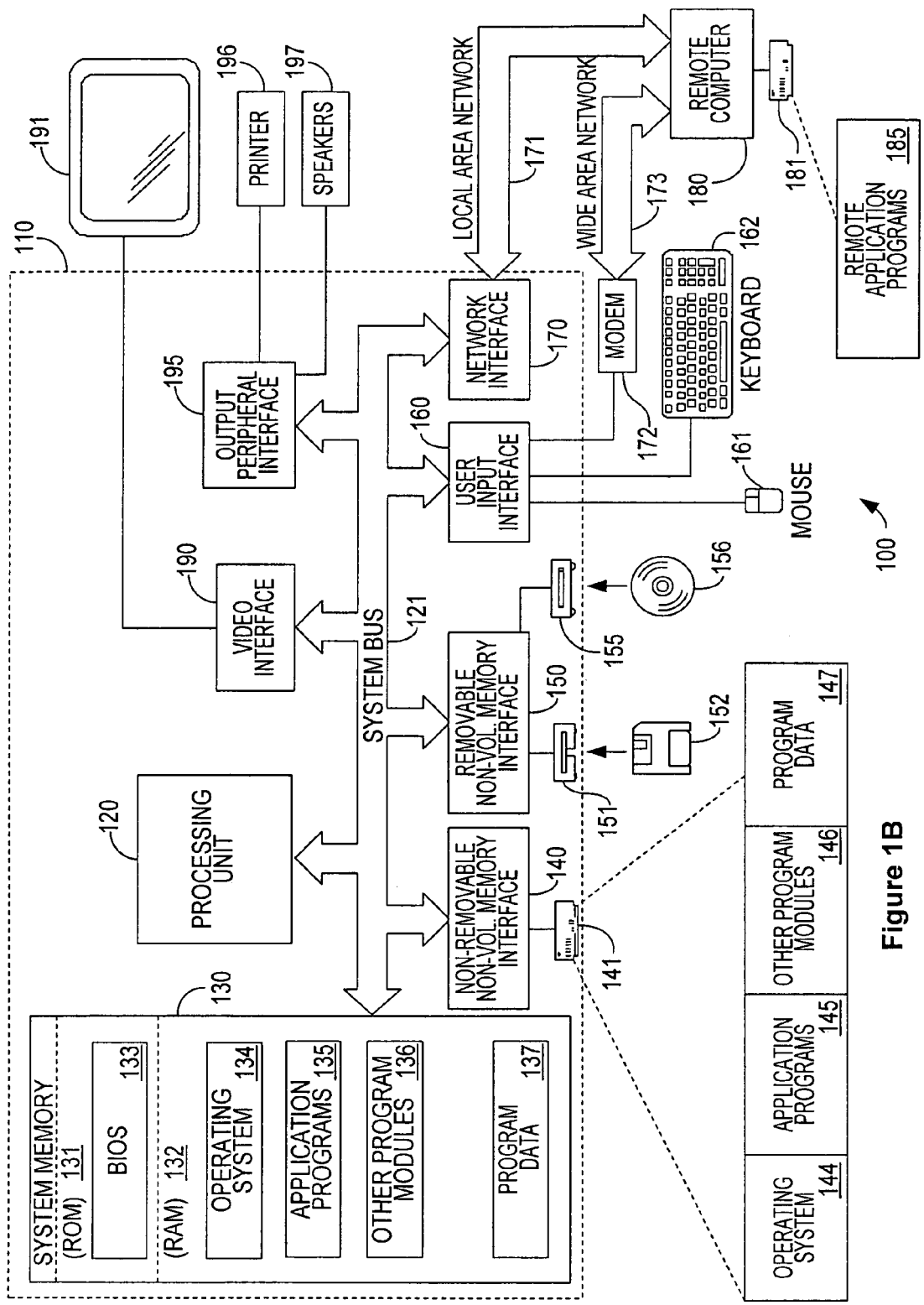
FIG. 1B is a block diagram generally illustrating an exemplary computer system on which the present invention resides.

FIG. 1B illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general-purpose or special-purpose computing system environments or configurations. Examples of well known computing systems, environments, and configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer-storage media including memory-storage devices.

With reference to FIG. 1B, an exemplary system for implementing the invention includes a general-purpose computing device in the form of a computer 110, which may act as a client, network server, quarantine server, or peer within the context of the invention. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture bus, Micro Channel Architecture bus, Enhanced ISA bus, Video Electronics Standards Associate local bus, and Peripheral Component Interconnect bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communication media. Computer storage media include both volatile and nonvolatile, removable and non-removable media implemented in any method or technology for the storage of information such as computer-readable instructions, data structures, program modules, or other data. Computer storage media include, but are not limited to, RAM, ROM, EEPROM, flash memory or other memory technology, CD-ROM, digital versatile disks or other optical disk storage, magnetic cassettes, magnetic tape, magnetic disk storage or other magnetic storage devices, or any other medium which can be used to store the desired information and which can be accessed by the computer 110. Communication media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of the any of the above should also be included within the scope of computer-readable media.

The system memory 130 includes computer storage media in the form of volatile and nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and program modules that are immediately accessible to or presently being operated on by the processing unit 120. By way of example, and not limitation, FIG. 1B illustrates an operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile, magnetic media, a magnetic disk drive 151 that reads from or writes to a removable, nonvolatile, magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary computing environment 100 include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as the interface 140, and the magnetic disk drive 151 and the optical disk drive 155 are typically connected to the system bus 121 by a removable memory interface, such as the interface 150.

The drives and their associated computer storage media discussed above and illustrated in FIG. 1B provide storage of computer-readable instructions, data structures, program modules, and other data for the computer 110. In FIG. 1B, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers to illustrate that, at a minimum, they are different copies.

A user may enter commands and information into the computer 110 through input devices such as a keyboard 162 and a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus. A monitor 191 or other type of display device is also connected to the system bus 121 via an interface, such as a video interface 190. In addition to the monitor 191, the computer 110 may also include other peripheral output devices such as speakers 197 and a printer 196 which may be connected through an output peripheral interface 195.

The computer 110 operates in a networked environment using logical connections to one or more remote computers, such as a remote computer 180. The remote computer 180 may be a personal computer, a server, a router, a network PC, a peer device, or other common network node and typically includes many or all of the elements described above relative to the personal computer 110 although only a memory storage device 181 has been illustrated in FIG. 1B. The logical connections depicted in FIG. 1B include a local area network (LAN) 171 and a wide area network (WAN) 173 but may also include other networks. Such networking environments are commonplace in offices, enterprise-wide computer networks, intranets, and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the personal computer 110, or portions thereof, may be stored in the remote memory storage device 181. By way of example, and not limitation, FIG. 1B illustrates the remote application programs 185 as residing on the memory device 181. It will be appreciated that the network connections shown are exemplary, and other means of establishing a communications link between the computers may be used.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
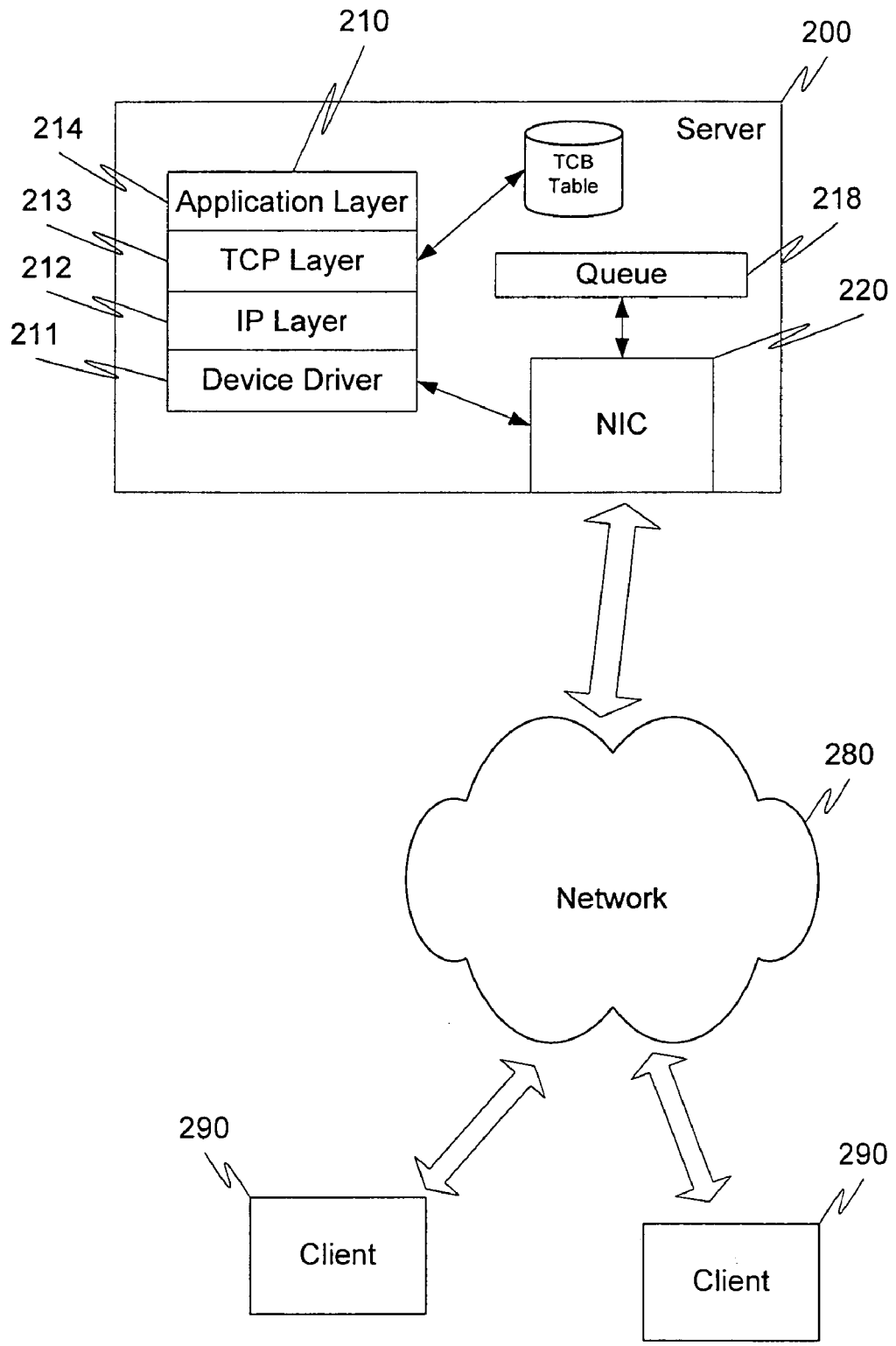
FIG. 2 is a block diagram illustrating a server operating on a TCP/IP network in accordance with the invention.

With reference to FIG. 2, the invention comprises a server 200 operating on an Internet Protocol (IP) network 280 and running Transport Control Protocol (TCP) to allow the establishment of one or more TCP connections with one or more clients 290. The server 200 comprises a TCP/IP stack 210 that implements the TCP/IP suite of protocols, and a Network Interface Card (NIC) 220 that receives packets over the physical network connection. The NIC 220 receives packets from clients 290 over the network 280. The packets may comply with many different protocols, e.g. TCP, IP, Internet Control Message Protocol (ICMP), User Datagram Protocol (UDP), etc. The NIC 220 receives the packets and inserts them into a queue 218 to await processing. The NIC 220 passes packets to the TCP/IP stack 210 through a device driver 211 for the NIC 220 in the TCP/IP stack 210. In the case where the packet is a TCP/IP packet, such as a synchronization (SYN) packet, the device driver 211 passes the packet to the IP layer 212, which directs the packet to the appropriate transport layer. In this example, the appropriate transport layer is the TCP layer 213. TCP layer 213 further processes the packet, and establishes a connection to transport packets between the IP layer 212 and the application layer 214. The application layer 214 may include applications such as telnet, File Transfer Protocol (FTP), email, etc. Because the TCP layer manages the establishment of TCP connections, the TCP layer further interacts with Transmission Control Block (TCB) Table 240. For each connection requested, the TCP layer 213 stores a TCB in TCB table 240. The TCB persists throughout the connection, and allows the TCP layer 213 to record the current state of the connection.

Figure 3A:
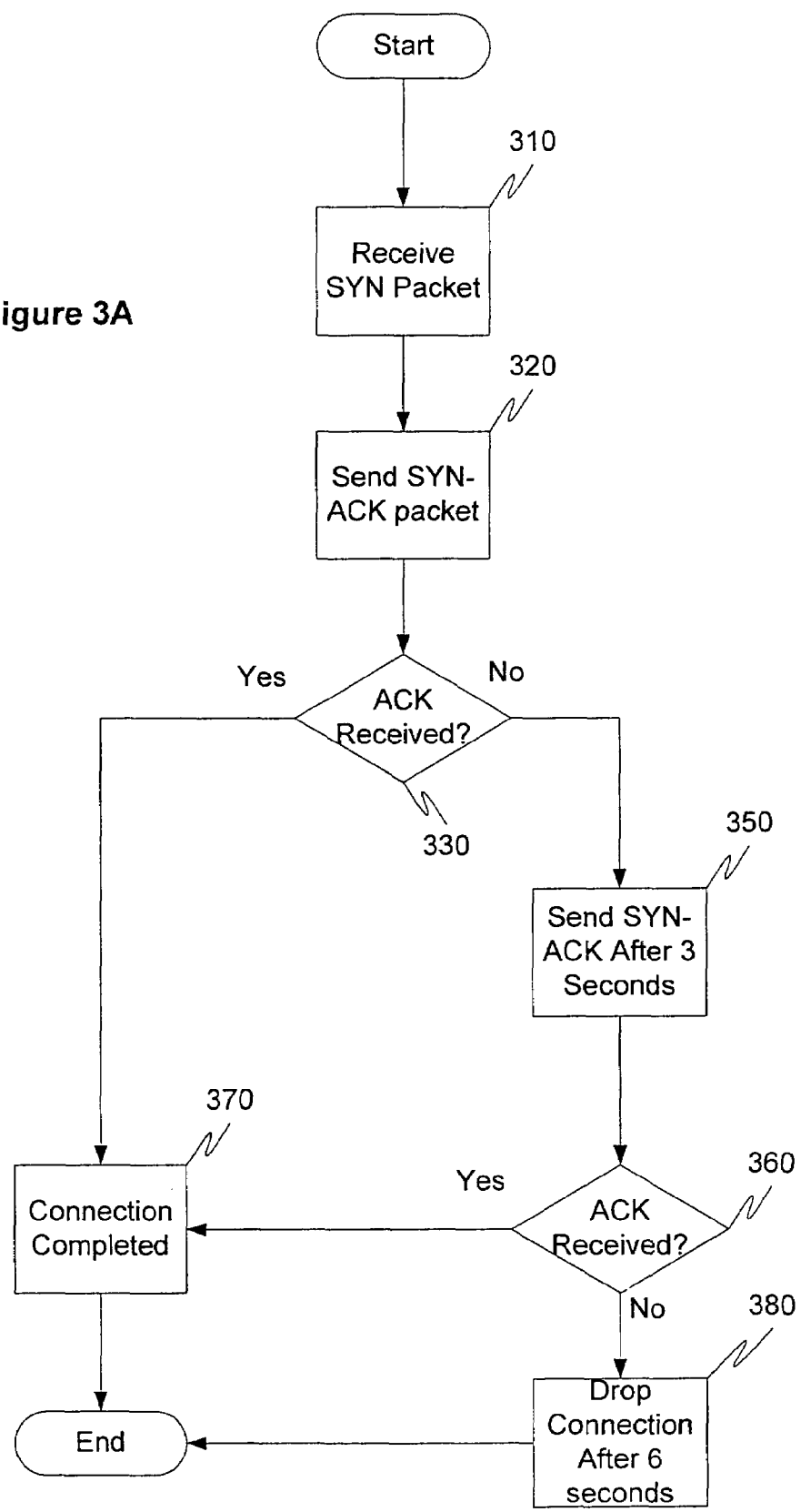
FIG. 3A is a flow diagram illustrating a method for processing SYN packets.

Because SYN attacks solely utilize TCP requests, the TCP connection establishment process is described in detail with reference to FIG. 3. At step 310 the server receives a SYN request packet from a client. A TCB is registered for the request in the TCB table. At step 320 the server sends a SYN-ACK packet to the client to acknowledge the SYN request. If at step 330 the client acknowledges with an ACK packet, the connection is completed at step 370. Otherwise, the server sends another SYN-ACK packet after 3 seconds at step 350. If at step 360 the client responds with an ACK packet, the connection is competed at step 370. Otherwise, the server waits 6 seconds and then deletes the TCB for that connection from the TCB table, thereby dropping the connection at step 380.

As shown, the processing required for each SYN packet requires certain resources. During a SYN flood attack, the amount of resources required to process the SYN packets is so great that the server is no longer able to establish and maintain non-malicious connections. Even already established connections are dropped because of the increased congestion on the inbound and outbound TCP channel. For example, the ACK message of a hypertext transfer protocol (HTTP) data packet might get lost in the SYN flood, causing the timer to time out and the TCB to be deleted for that connection. Accordingly, the present invention alleviates this congestion by reducing the amount of traffic on the TCP layer.

In the scenario previously described, the system is flooded with SYN packets, and the probability of losses is the same for SYN packets, which mostly are attack packets, and for other types of packets, which are almost all "good" packets. Thus, the invention applies a differential treatment to SYN packets, and immediately starts dropping, i.e. not processing or allocating a TCB, a fraction of the incoming SYN packets if too many are received. Dropping a fraction the SYN packets without processing them frees up system resources, and creates a better chance of maintaining existing connections.

The completion rate of connections, i.e. the ratio of connections established to connections completed, is not used as a control variable because it is very difficult in practice to distinguish between a connection that failed because of packet loss, and one that fails because it was abandoned by the user. In fact, reacting on the rate of successful connections would open an avenue for an attack. The attacker could establish connections, and then leave them hanging until they time out. The machine under attack would react by increasing the rate at which it drops SYN packets, effectively preventing the establishment of new connections. Instead, the invention determines a SYN packet drop rate based on the congestion of the system.

In one embodiment of the invention, the TCP/IP stack increases the SYN packet drop rate when the load on the server is too great, and decreases in the SYN packet drop rate when the load on the server is acceptable. Those skilled in the art of computer networking will understand that whether a load on the server is acceptable or unacceptable depends upon the processing capabilities of the server. In one embodiment of the invention, the TCP/IP stack may determine the load on the server is to high based on the length of the received packet queue. Thus, if the number of packets received by the NIC awaiting processing by the TCP/IP stack exceeds a threshold, the SYN drop rate is increased. In one embodiment of the invention, the SYN drop rate is increased by 0.01. If the number of packets is below the threshold, the SYN drop rate is the maximum of 0 and the SYN drop rate −0.01. This method is expressed as:

If (number of packets in queue>threshold value)

$SYNDropRate=SYNDropRate+0.01$

Else

*SYN*DropRate=*SYN*DropRate−0.01

Figure 3B:
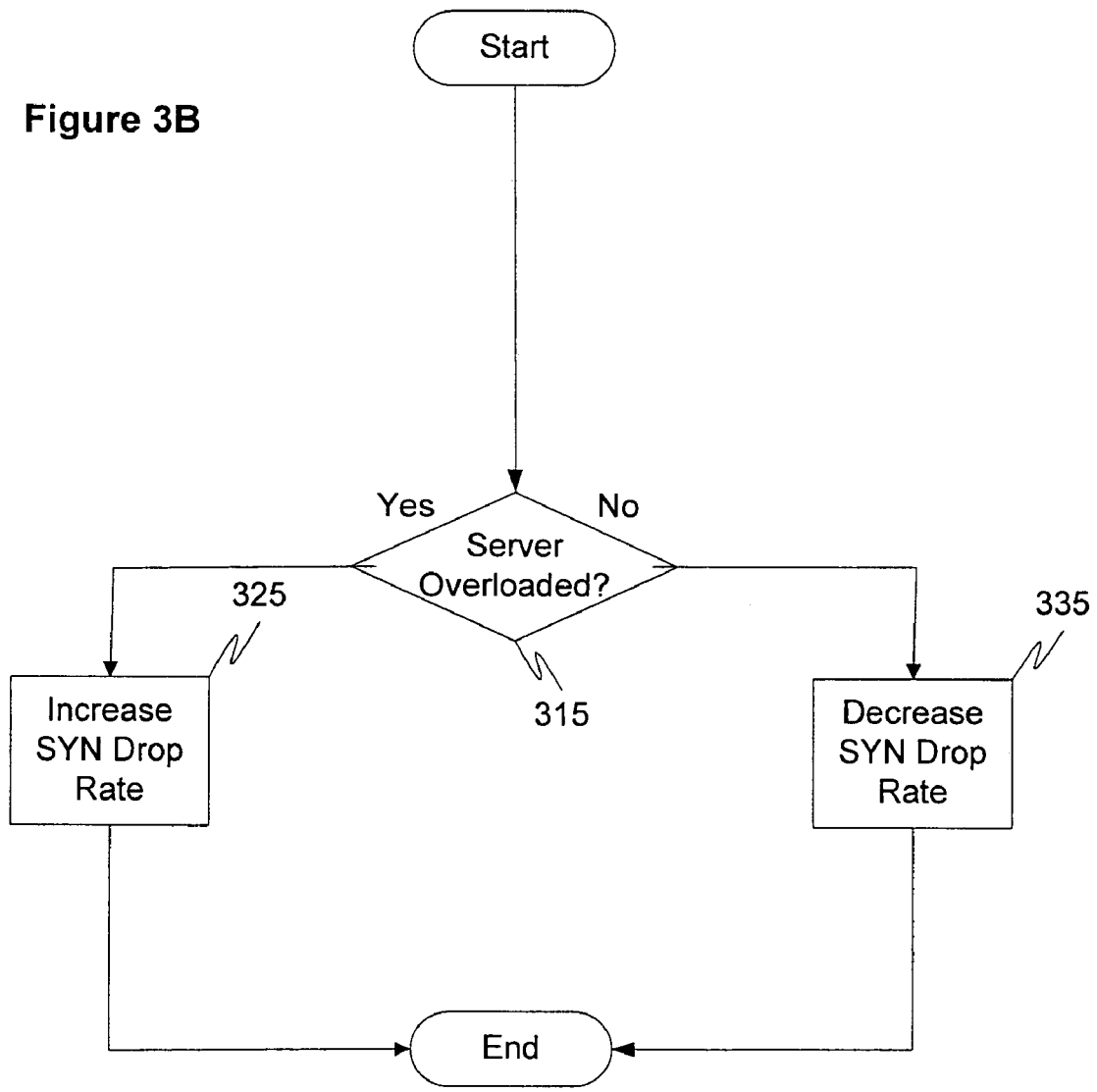
FIG. 3B is a flow diagram illustrating a method for determining whether to drop SYN packets in accordance with the invention.

This method is performed at an interval, e.g. once every second, and is further described with reference to FIG. 3B. At step 315 the TCP/IP stack determines whether the load on the server is too great. If the TCP/IP stack determines the server to be congested, the SYN drop rate is increased at step 325. If the TCP/IP stack determines the server is not congested, the SYN drop rate is decreased at step 335.

In another embodiment of the invention, the load on the server is determined by the rate at which the NIC drops packets, and SYN packets are dropped in accordance with the NIC drop rate. When the NIC drop rate is greater than zero, the amount of dropped SYN packets decreases, i.e., the SYN packet drop rate increases. Otherwise, the amount of SYN packets accepted for processing increases, i.e., the SYN packet drop rate decreases. This SYN packet drop rate is expressed as:

(NIC drop rate>0)

*SYN*DropRate=*SYN*DropRate+min (alpha, beta\**NIC*DropRate)

Else

*SYN*DropRate=*SYN*DropRate−alpha

The NIC drop rate is a noisy variable, influenced by events such as the emptying of queues when they overflow. Any attempt to use a large value for the coefficient "beta" would amplify that noise, and result in large oscillations. Thus, in one embodiment of the invention the coefficient alpha is set to 0.01, and the coefficient beta is set to 0.20. The optimal values for the coefficients may be different for different machines, and thus may be determined and set by the administrator of the server.

Figure 4:
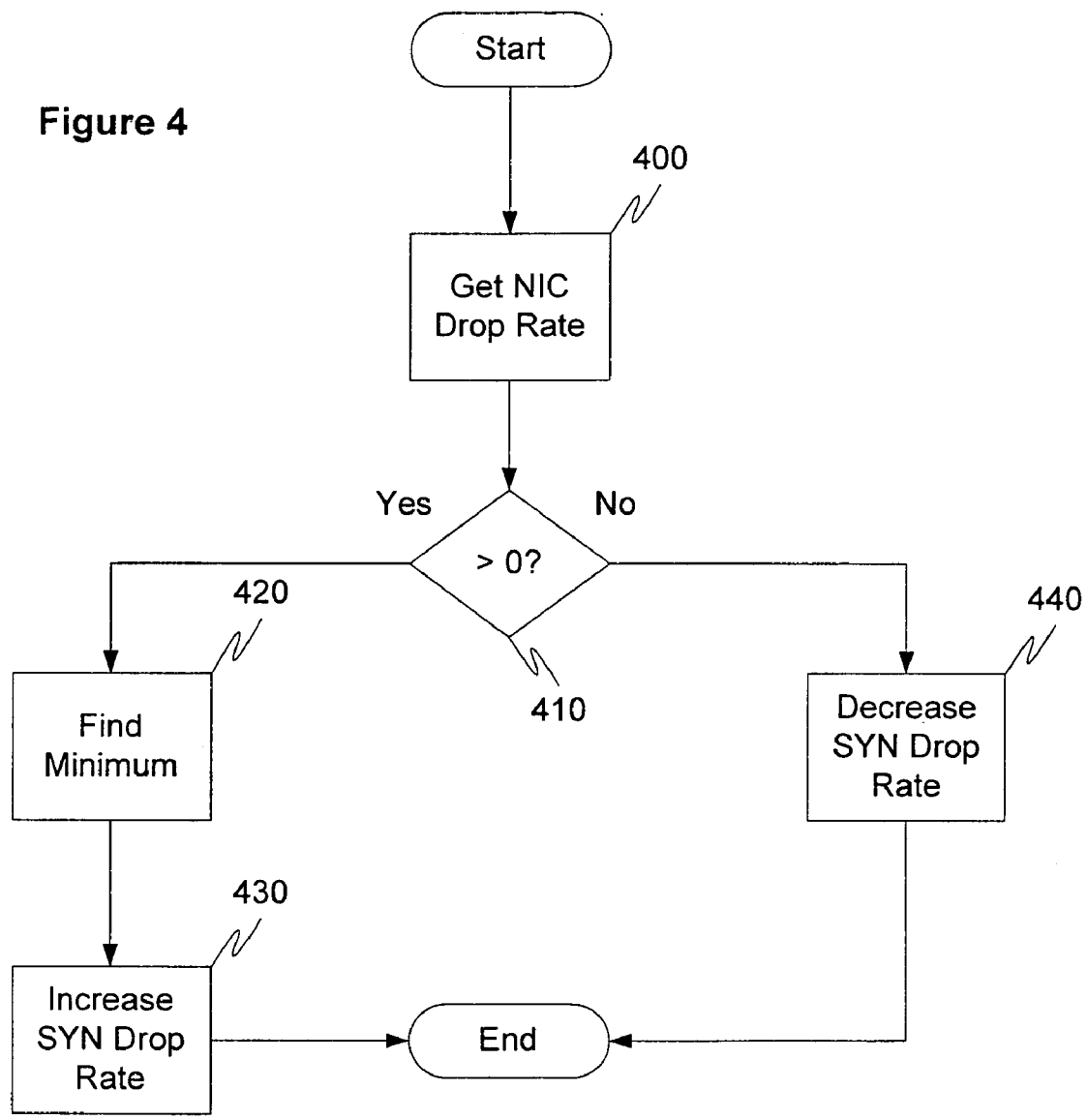
FIG. 4 is a flow diagram illustrating a method for determining whether to drop SYN packets in accordance with the invention.

Thus, in an embodiment of the invention, the TCP/IP stack executes the steps illustrated in FIG. 4 at an interval, e.g. every 500 milliseconds. At step 400, the TCP/IP gets the NIC drop rate. The TCP/IP stack determines if the NIC drop rate is greater than zero at step 410. If the NIC drop rate is greater than zero, the TCP/IP stack finds the minimum of alpha and beta multiplied by the NIC drop rate at step 420. The result of step 420 is added to the SYN drop rate to obtain the new SYN drop rate at step 430. If the NIC drop rate is not greater than zero, alpha is added to the SYN drop rate to obtain the new SYN drop rate at step 440.

Figure 5:
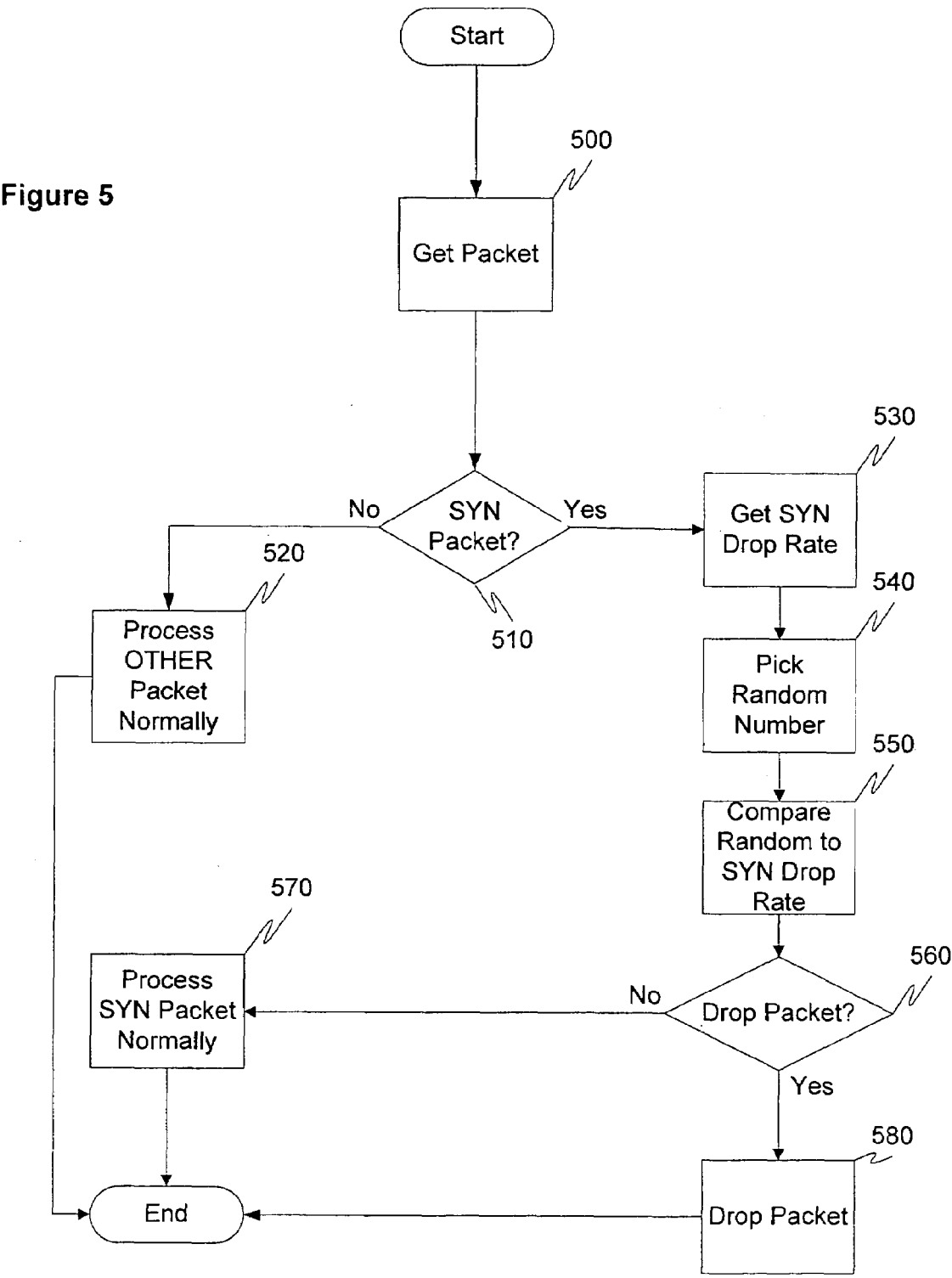
FIG. 5 is a flow diagram illustrating a method for defeating a SYN attack in accordance with the invention.

Thus, one embodiment of the invention behaves as illustrated in FIG. 5. At step 500, the TCP/IP stack gets a packet. At step 510, the TCP/IP stack determines whether the packet is a SYN packet, or whether the packet is an OTHER packet (e.g. a HTTP packet). If the packet is an OTHER packet, the packet is processed normally in accordance with how such packets are processed at step 520. If the packet is a SYN packet, the TCP/IP stack determines the current SYN drop rate at step 530. At step 540, the TCP/IP stack picks a random number between 0 and 1. At step 550, the TCP/IP stack compares the random number to the SYN drop rate. If the random number is determined to be greater than the SYN drop rate at step 560, the packet is processed normally at step 570. The TCP/IP continues with normal processing of the SYN packet, such as the process exhibited in FIG. 3. If the random number is determined to be less than the SYN drop rate at step 570, the SYN packet is dropped without processing at step 580. Thus, a TCB is never allocated for the dropped packet, thereby conserving the resources of the server.

Figure 6:
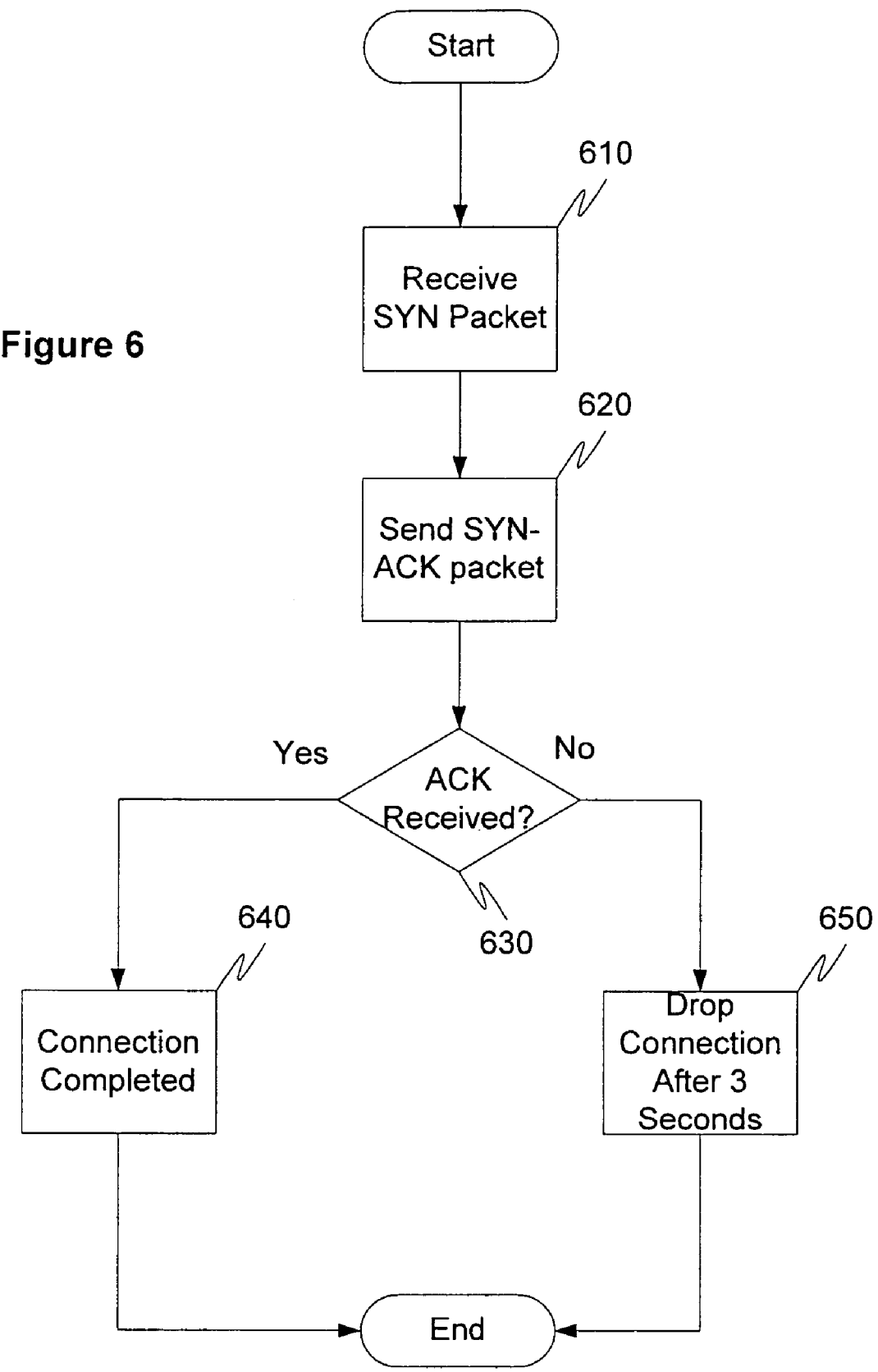
FIG. 6 is a flow diagram illustrating an alternative method for processing SYN packets in accordance with the invention.

In yet another embodiment of the invention, the SYN-ACK message is only transmitted once instead of twice. This embodiment reduces the amount of congestion, as well as reducing the amount of time that the TCP layer maintains a TCB in the TCB table. With reference to FIG. 6, at step 610 the server receives a SYN request packet from a client. A TCB is registered for the request in the TCB table. At step 620 the server sends a SYN-ACK packet to the client to acknowledge the SYN request. If at step 630 the client acknowledges with an ACK packet, the connection is completed at step 640. Otherwise, the server waits 3 seconds and then deletes the TCB for that connection from the TCB table, thereby dropping the connection at step 650.

Thus, even under a very harsh SYN attack, the server would still manage to serve some connections. This means that, even under the worse conditions, a client that would be willing to retry connections would eventually get connected. Moreover, those connections that were successfully established are served very fast: CPU load of the system is contained, the send path is not congested, and the loss rate of non SYN packets is maintained at a low value. Therefore, at least one embodiment of the invention provides, inter alia, the following advantages: 1) it drops incoming SYN at random before processing them, which results in a much lower system load that if a context was created and a SYN-ACK sent; 2) it uses an adaptive algorithm to control the rate at which SYN are dropped, and ends up converging on the rate that maximizes the responsiveness of the system; and 3) it avoids using preset parameters, and will converge on a rate of SYN acceptance that is a function of the capacity of the system (i.e., the NIC drop rate).

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A server operating on an Internet Protocol (IP) network and running Transport Control Protocol to allow the establishment of one or more TCP connections with one or more clients, the server being configured to defeat a SYN flood attack, comprising:

a network interface card (NIC) receiving packets over the network and inserting the packets into at least one queue; and a TCP/IP stack processing packets from the at least one queue, wherein the TCP/IP stack intentionally drops SYN packets at a SYN drop rate that is at least partly dependent upon a load on the server, the load being determined based on packet processing on the NIC.

2. The server of claim 1, wherein the SYN drop rate is increased when the load on the server is above a threshold, and the SYN drop rate is decreased when the load on the server is not above the threshold.

3. The server of claim 2, wherein the load on the server is determined by a length of the at least one queue.

4. The server of claim 2, wherein the NIC drops packets at a NIC drop rate and the load on the server is determined by the NIC drop rate.

5. The server of claim 4, wherein the TCP/IP stack comprises a random number generator and a comparison mechanism, the comparison mechanism being adapted and configured, for each SYN packet, to compare a random number to the SYN drop rate.

6. The server of claim 4, wherein the SYN drop rate is increased by the minimum of a first coefficient and a second coefficient multiplied by the NIC drop rate.

7. The server of claim 6, wherein the first coefficient is 0.01 and the second coefficient is 0.20.

8. The server of claim 4, wherein the SYN drop rate decreases when the NIC drop rate is not greater than zero.

9. The server of claim 8, wherein the SYN drop rate is decreased by a coefficient.

10. The server of claim 9, wherein the coefficient is 0.01.

11. A method for defeating a SYN flood attack on a server, operating on an Internet Protocol (IP) network and running Transport Control Protocol to allow the establishment of one or more TCP connections with one or more clients, comprising:
receiving a plurality of packets, the packets including SYN packets and non-SYN packets;
determining a load on the server the load being determined based on packet processing on a Network Interface Card (NIC);
adjusting a SYN packet drop rate according to the load on the server, wherein the SYN packet drop rate determines how many SYN packets are dropped while processing TCP/IP packets on the server.

12. The method of claim 11, wherein adjusting a SYN packet drop rate further comprises increasing the SYN packet drop rate when the load on the server is determined to be above a threshold, and decreasing the SYN packet drop rate when the load on the server is determined to be not above the threshold.

13. The method of claim 12, wherein the load on the server is determined by a length of at least one queue on the NIC containing packets awaiting processing.

14. The method of claim 12, wherein a NIC drop rate signifies how many packets are being dropped by the NIC due to the load on the server, and the SYN packet drop rate is adjusted based at least partly on the NIC drop rate.

15. The method of claim 14, further including increasing the SYN packet drop rate when the NIC drop rate is greater than zero.

16. The method of claim 15, wherein the SYN packet drop rate is increased by the minimum of a first coefficient and a second coefficient multiplied by the NIC drop rate.

17. The method of claim 16, wherein the first coefficient is 0.01 and the second coefficient is 0.20.

18. The method of claim 14, further including decreasing the SYN packet drop rate when the NIC drop rate is not greater than zero.

19. The method of claim 18, wherein the SYN packet drop rate is decreased by a coefficient.

20. The method of claim 19, wherein the method further comprises for each SYN packet received, comparing a random number to the SYN packet drop rate and dropping the SYN packet if the random number is less than SYN packet drop rate.

21. A computer-readable medium having computer-executable instructions for performing the steps comprising:
receiving a plurality of packets over a network, the packets including SYN packets and non-SYN packets;
determining a load on the server, the load being determined based on packet processing on a Network Interface Card (NIC); and
adjusting a SYN packet drop rate according to the load on the server, wherein the SYN packet drop rate determines how many SYN packets are dropped by a TCP/IP stack.

22. The computer readable medium of claim 21, wherein the step of adjusting a SYN packet drop rate further comprises increasing the SYN packet drop rate when the load on the server is determined to be above a threshold, and decreasing the SYN packet drop rate when the load on the server is determined to be not above the threshold.

23. The computer readable medium of claim 22, wherein the load on the server is determined by a length of at least one queue on the NIC containing packets awaiting processing.

24. The computer readable medium of claim 22, wherein a NIC drop rate signifies how many packets are being dropped by a NIC due to the load on the server, and the SYN packet drop rate is adjusted based at least partly on the NIC drop rate.

25. The computer-readable medium of claim 24, the steps further comprising increasing the SYN packets drop rate when the NIC drop rate is greater than zero.

26. The computer-readable medium of claim 25, wherein the SYN packet drop rate is increased by the minimum of a first coefficient and a second coefficient multiplied by the NIC drop rate.

27. The computer-readable medium of claim 26, wherein the first coefficient is 0.01 and the second coefficient is 0.20.

28. The computer-readable medium of claim 24, the steps further comprising decreasing the SYN packet drop rate when the NIC drop rate is not greater than zero.

29. The computer-readable medium of claim 28, wherein the SYN packet drop rate is decreased by a coefficient of 0.01.

30. The computer-readable medium of claim 21, further having computer executable instruction for performing steps comprising:
determining the load based on packet processing on the NIC.

* * * * *